Nov. 11, 1952 — T. T. STACK — 2,617,971
OVERLOAD CONTROL FOR MOTORS
Filed Dec. 4, 1950 — 2 SHEETS—SHEET 1

INVENTOR.
Theodore T. Stack
BY Charles F. Vajtech
atty.

Nov. 11, 1952　　　　　T. T. STACK　　　　2,617,971
OVERLOAD CONTROL FOR MOTORS
Filed Dec. 4, 1950　　　　　　　　　　　2 SHEETS—SHEET 2

INVENTOR.
Theodore T. Stack
BY
Charles J. Vajtech
atty.

Patented Nov. 11, 1952

2,617,971

UNITED STATES PATENT OFFICE 2,617,971

OVERLOAD CONTROL FOR MOTORS

Theodore T. Stack, Chicago, Ill., assignor to Crane Packing Company, Chicago, Ill., a corporation of Illinois Application December 4, 1950, Serial No. 198,983

5 Claims. (Cl. 318—476)

This invention relates to overload control devices for hand operated power tools such as automatic screwdrivers, tappers, drills, tube expanders, and the like.

In the operation of portable motor driven tools, it frequently happens that the tool then in use becomes stuck in the work and the entire motor reaction is then transferred to the housing which is normally held in the operator's hand. Should the sticking occur suddenly, the resultant reverse torque on the housing may be sufficiently great either to cause the operator to lose his grip on the tool, or to actually physically sweep the operator off his feet. In the first case, the hand controlled power driven tool can cause considerable damage either to itself, to the associated power line, be it electric or pneumatic, or to personnel, and in the case of knocking the operator off his feet, the harm to the operator is quite apt to be considerable, particularly where the tool is used on a construction job and the operator is perched on a temporary scaffold, or the like.

In another form, power driven tools may be used to expand tubes to a predetermined amount, to tighten screws to a particular torque value, or to drive a thread-cutting device in a blind hole. In each one of these cases, it is desirable to be able to stop the operation of the tool when a predetermined condition is reached. Since in the latter case the same power driven device might be used for a number of different size tools, it would be desirable to make the power driven device adjustable so as to stop at different conditions.

There has been devised a control for an electric motor used in a portable tool wherein the motor is shut off when a predetermined torque load is impressed on the motor spindle. The device as proposed is in the form of a separate container in which are located current-sensitive devices electrically connected with the motor to stop the motor when the current through the motor reaches a preset value. These devices are rather cumbersome and expensive and require that they be located in proximity to the tool itself, with electric cables connecting the electric tool with the control. On construction jobs, these separate containers are subject to considerable abuse, either from the operator or from falling objects, and hence because the electrical contents thereof are relatively delicate, the container itself must be extremely rugged and the control dial of the device must be fool-proof.

The principal object of this invention is to provide a control device for a portable electric motor driven tool which may be incorporated in the tool itself so as to obviate the necessity for separate containers and long connecting cables.

A more specific object of this invention is to provide a simple, small overload control device for an electric motor driven tool which will be inexpensive and readily serviced by the operator himself.

A still more specific object of this invention is to provide an overload control device for an electric motor driven tool wherein the device is incorporated in the handle of the tool, thereby effecting considerable economy both in space and cost.

Yet another specific object of this invention is to provide an overload control device for an electric motor driven tool, said device being in the form of a solenoid incorporated in the handle of the tool, with means for passing the air from the electric motor fan past the solenoid so as to maintain constant electrical characteristics in the solenoid.

These and other objects of this invention will become apparent from the following detailed description when taken together with the accompanying drawings, in which Fig. 1 is a plan view of an electric motor driven tool and handle having the control of this invention applied thereto;

Figure 1:
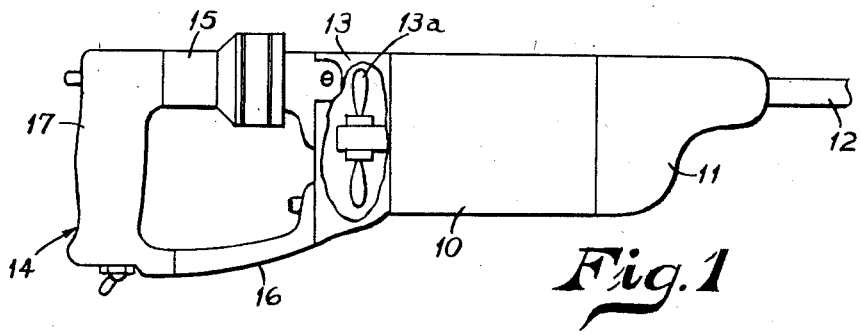

Referring now to Fig. 1 for a detailed description of the invention, the motor driven tool chosen for purposes of illustration is comprised of a housing 10 within which is mounted an electric motor (not shown) mechanically connected to a gear reducer and reverse mechanism 11 (not shown) driving an output shaft or spindle 12. The usual tapered opening (not shown) is formed on the end of spindle 12 to receive the tapered shank of a tube expander, drill bit, thread tapper, etc. To the left of the housing 10 as viewed in Fig. 1 is a frame member 13 which houses the rear bearing for the motor and also the fan 13a which draws cooling air through the motor to prevent the latter from overheating. Secured to frame 13 is a handle 14 which may be comprised of two horizontal sections 15 and 16 connected by a vertical section 17.

It is contemplated that the tool will be held in the operator's right hand by means of handle 14 and will be supported and guided by the operator's left hand contacting the housing 10. In the normal operation of the device, the operator will push forward on handle 14 to effect the operation of whatever tool is used at the moment and will pull back on handle 14, i. e., to the left as viewed in Fig. 1 to engage the reverse gear and back the tool out of the work.

The overload control of this invention in its broad aspects is comprised of a solenoid in series with the motor, and an armature operated by the solenoid and adapted to operate a microswitch, the latter breaking the circuit through the motor to stop the operation thereof. The point at which the solenoid is effective to operate the armature may be varied by changing the initial position of the solenoid relative to the armature so that a different amount of current will be required to pull the armature. Thus the solenoid may be spaced further from the armature when it is desired to stop the motor at heavier torque loads, and may be placed closer to the armature when it is desired to stop the motor at relatively light loads, the intermediate positions being used for intermediate cut-off points.

Figure 2:
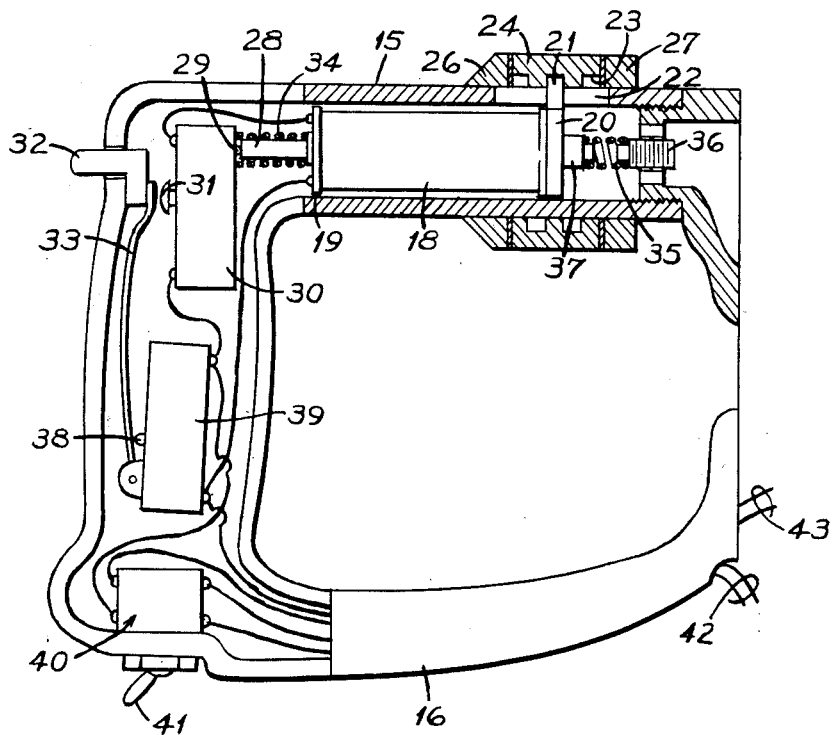
Fig. 2 is a cut-away view of the handle of the device of Fig. 1, the handle being enlarged to show more clearly the details of construction thereof.

Referring now to Fig. 2, it will be observed that the handle 14 is hollow and that the horizontal portion 15 is somewhat tubular to receive the cylindrical coil 18 of the solenoid of this invention. Said coil 18 is mounted on a spool 19, one end of which is provided with a pin 21 extending through a slot 22 in the tubular horizontal portion 15. The protruding end of pin 21 is received in a helical groove 23 formed on the interior of a collar 24 which is fixed axially on tubular portion 15 by means of a pair of stop rings 26 and 27, both of which are welded, pinned or otherwise secured to tubular section 15.

Thus by rotating collar 24, pin 21 is moved axially with respect to the tubular portion 15, and this axial movement is translated into a similar axial movement of spool 19 and its coil 18.

Within spool 19 is an armature 28 which is axially movable with respect to spool 19. One end of armature 28 contacts the control arm 29 of a microswitch 30 which is provided with a reset button 31 to be contacted by a manually controlled button 32 projecting through the vertical portion 17 of the handle 14. A spring 33 of the leaf type normally holds button 32 in its outward position, i. e., in a position away from microswitch reset button 31.

A spring 34 normally urges armature 28 to the right as viewed in Fig. 2 away from microswitch control arm 29 so that the energy of the solenoid coil 18 is required to overcome spring 34 before microswitch 30 can be operated. A spring 35 compressed between a screw-type abutment 36 on the interior of the handle and the right-hand end 37 of armature 28 as viewed in Fig. 2 opposes spring 34. Springs 34 and 35 serve to prevent armature 28 from moving inadvertently due to shock or to some sudden movement incident to the operation of the motor and its associated tool. Obviously, armature 28 is free to move in solenoid 18 under influences other than electromagnetic attraction, and unless it is restrained, unwarranted cut-offs would result. Springs 34 and 35 are sufficiently powerful to prevent movement of armature 28 except under the influence of solenoid 18.

Spring 33 also operates the button 38 of a microswitch 39, the function of which is to maintain the operation of the motor during the initial current surge which is produced when starting the motor and which normally would cause the solenoid to operate to cut the motor off before it got started. Thus the operation of button 32 serves not only to operate reset button 31 but also to hold the motor in operation until the initial current surge is past.

A master switch 40 is incorporated in the handle, said master switch having an operating lever 41 having an "on" and "off" position. Said master switch must be turned to its "on" position to energize both the motor and its control. The various connecting wires such as 42 which are connected to the exterior power line 43 and to the motor, pass through the horizontal portion 16 of the handle and are then distributed to the various devices in the handle just described.

Figure 3:
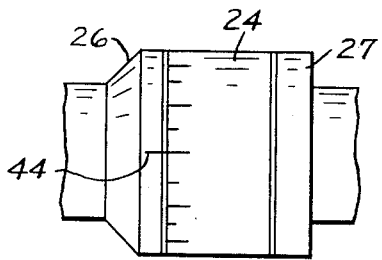
Figs. 3 and 4 are fragmentary exterior and sectional views respectively of the adjusting means of the device.

In order that the operator may be able to set the device to cut off at a predetermined load, sleeve 24 is ruled on the exterior thereof as shown in Fig. 3 in any desired graduations and a reference zero point and line 44 may be marked on collar 26. The markings may be arbitrary numerals, or they may correspond to loads, sizes of tools to be used, etc.

Figure 5:
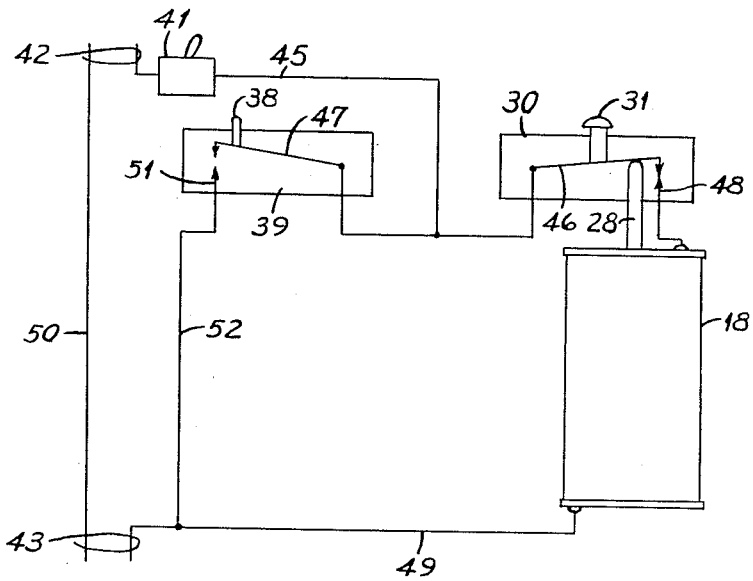
Fig. 5 is a schematic wiring diagram of the control.

The electric circuit is quite simple and as shown in Fig. 5 is comprised of a power line 42 having one lead 45 connected to switch arms 46 of microswitch 30 and to switch arm 47 of microswitch 39. The fixed contact 48 of microswitch 30 is connected to solenoid coil 18 and the other side of solenoid coil 18 is connected through conductor 49 to one of the motor leads 43. The other motor lead 50 is connected directly to the other side of the line 42. The fixed contact 51 of microswitch 39 is connected through a conductor 52 to conductor 49 so that the microswitch 39 is in parallel with solenoid 18 and serves to connect the line 42 through the motor around solenoid 18. It will be noted that armature 28 acts directly against switch arm 46 to open the switch, i. e., to break the circuit through the solenoid when the current reaches a predetermined value. Once the switch arm 46 is moved it remains in its moved position until reset button 31 is pressed.

Figure 4:
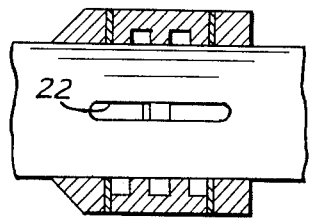

In the normal operation of the machine, a control switch 41 is first operated to supply current to lead 45. Next, button 32 is pushed inward relative to handle 14 which in turn causes reset button 31 and button 38 to be depressed by means of spring 33. Said button 32 is held in its inward position for approximately one second, after which it may be released, but the motor will continue to operate due to the establishment of a circuit through microswitch 30 and solenoid 18 through the motor. When the current through the solenoid reaches a predetermined value as determined by the increase in load upon the motor brought about by the completion of the operation on which it is used, armature 28 will be pulled up against switch arm 46 to break the circuit to fixed contact 48, whereupon the circuit to motor leads 43 will be broken and the motor will stop. If it is desired to vary the cutoff point, sleeve 24 is rotated, thereby causing the pin 21 to move axially in its slot 22 (Figs. 2 and 4) until a desired position of the solenoid relative to its armature 28 is reached as indicated by the indicia on the exterior of the sleeve 24.

It is to be noted that the solenoid coil 18 which is disposed within the hollow tubular portion 15 of the handle is thus maintained in the slip stream of air initiated by the fan 13a. By this arrangement the coil is prevented from becoming overheated and there will be no appreciable rise in the reactance thereof after a predetermined initial operation of the motor.

It is understood that the foregoing description is illustrative of preferred embodiments of this invention and that the scope of the invention is not to be limited thereto, but is to be determined by the appended claims.

What is claimed is:

1. In a portable motor driven tool, a motor housing, a motor operatively disposed within the housing, an electric circuit for the motor, a handle including a hollow tubular member secured to the motor housing and in communication with the interior thereof, relay means including an electromagnet disposed within said hollow tubular member and responsive to a predetermined flow of current in said motor for stopping the motor when said predetermined current flow has been attained, and a cooling fan for the motor disposed within said housing and arranged to draw cooling air through said hollow tubular member past said electromagnet to cool the latter and prevent a rise in the reactance thereof after a predetermined initial operation of the motor whereby the electrical characteristics of said electromagnet are maintained substantially constant.

2. A portable motor-driven tool as described in claim 1, said relay means comprising a solenoid, an armature operated by the solenoid, resilient means acting upon the armature for resisting the operation of the armature, a switch operated by the armature and means for varying the initial position of the solenoid relative to the armature, whereby to stop the motor at various predetermined loads on said motor.

3. A portable motor-driven tool as described in claim 1, said relay means comprising a solenoid, an armature operated by the solenoid, a switch operated by the armature, resilient means acting upon the armature for resisting the operation of the armature, a slot in the handle, and a pin connected to the solenoid and extending through the slot to the exterior of the handle, whereby to vary the initial position of the solenoid relative to the armature by moving the pin in the slot and thus stop the motor at various predetermined loads on the motor.

4. A portable motor-driven tool as described in claim 1, said relay means comprising a solenoid, an armature operated by the solenoid, resilient means acting upon the armature to hold the armature against movement in either direction along the lines of magnetic force generated by the solenoid, and a switch operated by the armature.

5. A portable motor-driven tool as described in claim 1, said relay means comprising a solenoid, an armature operated by the solenoid, a switch operated by the armature, resilient means acting upon the armature for resisting the operation of the armature, said handle having a slot, a pin connected to the solenoid and extending through the slot, and a rotatable sleeve on the handle disposed over the slot and having an internal helical groove for receiving the pin, whereby to vary the initial position of the solenoid relative to the armature by rotating the sleeve to move the pin in the slot and thus stop the motor at various predetermined loads on the motor.

THEODORE T. STACK.

REFERENCES CITED

The following references are of record in the file of this patent:

UNITED STATES PATENTS

| Number | Name | Date |
|---|---|---|
| 833,178 | Rennerfelt | Oct. 16, 1906 |
| 1,218,236 | Backscheider | Mar. 6, 1917 |
| 1,551,752 | Kriesel | Sept. 1, 1925 |
| 1,913,993 | Mader | June 13, 1933 |
| 2,310,166 | Way | Feb. 2, 1943 |